Nov. 22, 1927.
F. C. MOCK
SHOCK ABSORBER
Filed Oct. 5, 1922
1,650,087
2 Sheets-Sheet 1
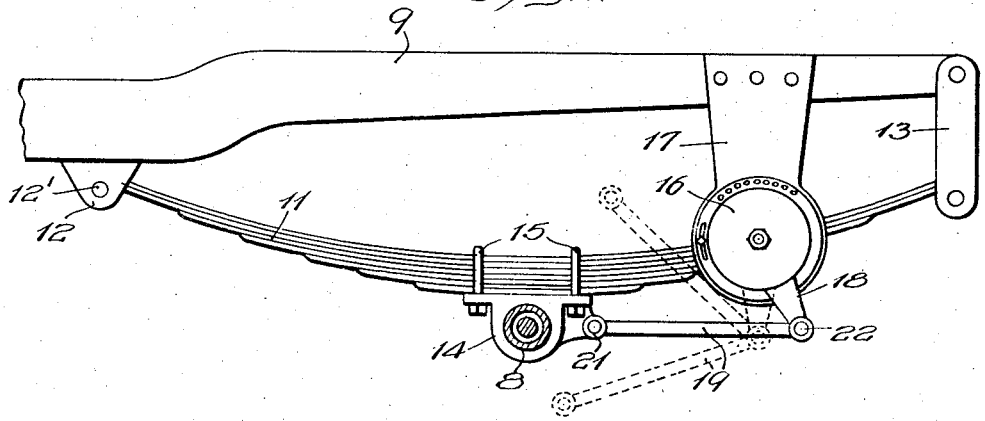
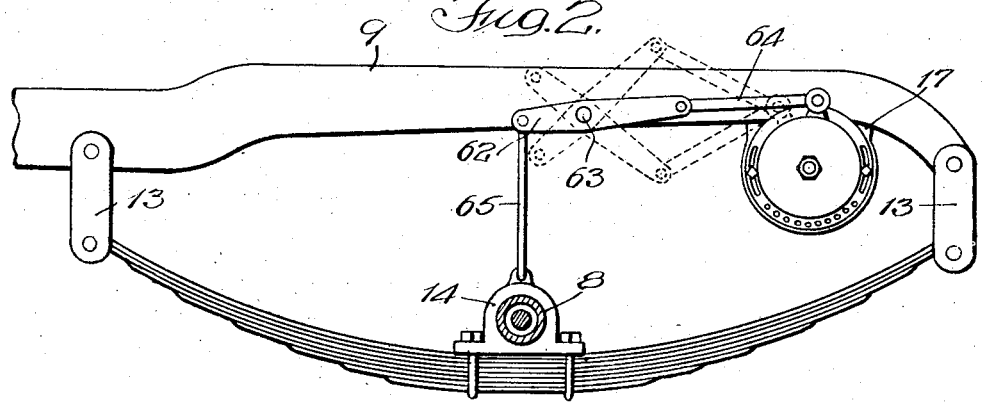
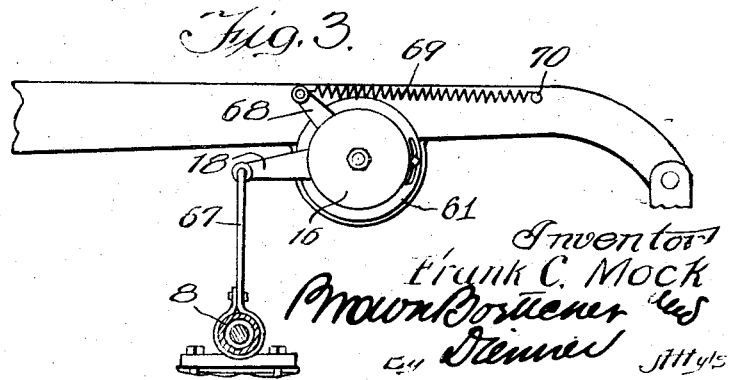
Inventor
Frank C. Mock Nov. 22, 1927.
F. C. MOCK
SHOCK ABSORBER
Filed Oct. 5, 1922
1,650,087
2 Sheets-Sheet 2
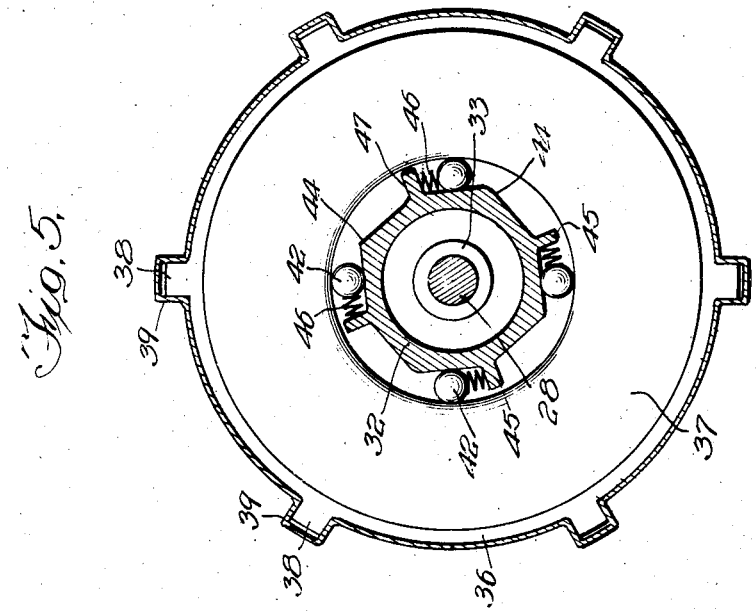
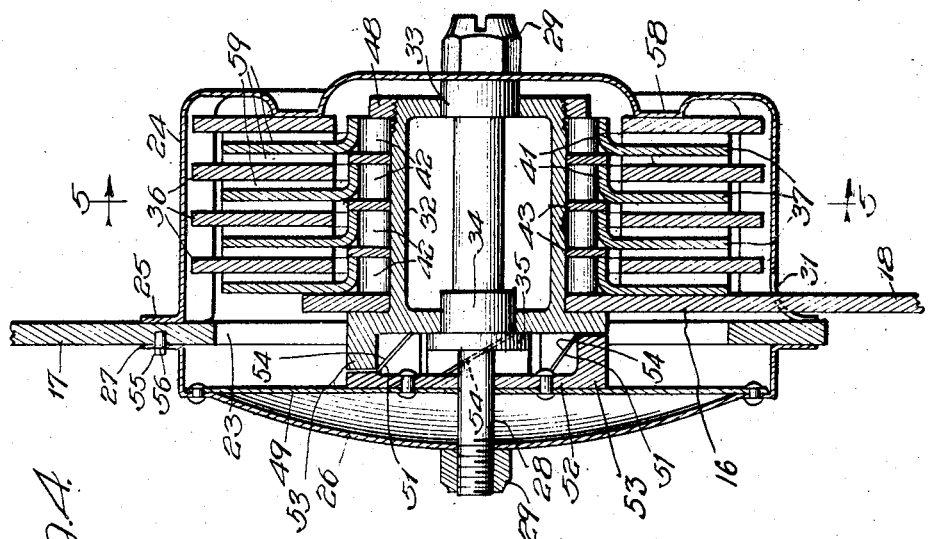
Inventor:
Frank C. Mock Patented Nov. 22, 1927.

1,650,087

UNITED STATES PATENT OFFICE.

FRANK C. MOCK, OF CHICAGO, ILLINOIS, ASSIGNOR TO STROMBERG RESEARCH CORPORATION, OF CHICAGO, ILLINOIS, A CORPORATION OF ILLINOIS.

SHOCK ABSORBER.

Application filed October 5, 1922. Serial No. 592,514.

The present invention relates to shock absorbers.

My observation of the forces and principles involved in absorbing automobile road shocks, and my experiments with prior forms of shock absorbers have led to the conclusion that the desideratum in shock absorbers is a device which, when the axle is moving out of its normal position relative to the chassis will interpose a minimum or substantially no damping retardation, but, which, when the axle is moving back into its normal position, will interpose a maximum retardation. A further object in this connection is to provide a shock absorber which will have the above action when moved to either side of normal, i. e., either when the axle is forced upwardly towards the chassis by a positive bump encountered in the road-bed, or when the axle drops downwardly away from the chassis by the wheel dropping into a depression.

A further object towards which the present shock absorber has been designed, is to increase the frictional retardation in accordance with the increase of restoring force in the leaf spring. The greater the flexure of the leaf spring when striking a bump, the greater the restoring force built up in the leaf spring, and to properly check the recoil it is necessary that the frictional retardation offered by the shock absorber be of large moment for a large restoring force and of small moment for a small restoring force. In this connection, it may be pointed out that the potential energy present under the forced deflection of the spring is proportional to the square of the distance of deflection, and this condition results in the peculiar fact that the time required for free return from a condition of deflection to normal is the same under all distances of deflection, so that the actual velocity of return of the axle is very much greater with big deflections than with small ones. With the present construction, the friction opposed to the return from deflection is proportional to the distance of deflection, this friction being greatest at the maximum deflection of the spring and tapering down to substantially nothing as the axle approaches its normal position. The result is that the spring action approximates what it would otherwise be on a small bump or hole, and is much slower on the big deflection swings resulting from large bumps. This action possesses a pronounced advantage over those prior art devices having a constant degree of friction regardless of relative position between the chassis and axle, because such constant degree of friction tends to prevent the spring from returning to normal. For example, after the axle passes over one bump, the spring deflects under the compression resulting from the bump but does not quite return to its normal position because of the action of the frictional device, thus leaving it in a slightly strained condition so that the spring is under a greater stress than the weight of the body and will therefore, be more rigid and less resilient under the strain of the next bump. This action can also occur with devices which oppose frictional retardation to separation of the axle and chassis, such frictional retardation making the vehicle ride very heavily over what is known as a choppy road with a succession of small holes or depressions. The condition outlined in either of the foregoing instances is avoided in the present device by the fact that the frictional resistance decreases to practically nothing as the spring returns to its normal position of deflection under steady load. Hence, there is no added frictional restraint stored up from one shock to the next.

It is a further object to provide a construction requiring only comparatively light spring pressure between the friction surfaces for effective retardation, even in positions of maximum deflection. The variable friction which the present device opposes to the return from deflection is obtained by varying the spring pressure effective between the frictional surfaces, and this spring energy is stored up in the deflection of the spring away from normal. In accordance with the above expressed object of permitting free deflection of the main leaf spring to either way from normal it is desirable that the energy which it is required to store in the shock absorber spring be comparatively small. This is obtained by increasing the area of frictional surface, preferably by providing a multiplicity of frictional disks instead of the two disks which have been generally employed heretofore. By thus increasing the aggregate area of frictional surface the spring pressure can be made comparatively light and a large frictional retardation obtained.

Referring to the accompanying drawings illustrating a preferred embodiment of my invention:

Figure 1 is an elevational view of an automobile axle and its spring suspension, illustrating one application of my improved shock absorber thereto;

Figure 2 is a similar view illustrating another application of my improved shock absorber;

Figure 3 is a similar view illustrating still another application of my improved shock absorber;

Figure 4 is a longitudinal sectional view through the shock absorber, and

Figure 5 is a transverse sectional view taken approximately on the plane at the line 5—5 of Figure 4.

The axle 8 may have any conventional spring suspension on the vehicle chassis 9, my improved construction of shock absorber being applicable to all types of spring suspensions. In the arrangement shown, the front end of the spring 11 is pivoted to a lug 12 secured to the frame, and the rear end of the spring is pivoted to a shackle link 13 which is pivoted to the frame. The axle 8 is secured to the spring 11 by the usual spring pad 14 and U bolt or other anchoring means 15.

The drum unit 16 of my improved shock absorber is rigidly mounted with respect to the frame 9, as by mounting this drum unit on the end of a depending bracket 17 which is bolted to the frame 9. Obviously, this relation could be reversed by rigidly mounting the drum unit with respect to the spring and securing the relative motion between the drum unit and the frame, but I consider the arrangement illustrated preferable. An operating arm 18 extends down from the drum unit 16 and the lower end of this operating arm is disposed in substantially the same horizontal plane as the axle 8 when the latter is in its normal position, as indicated in Figure 1. A link 19 has pivotal connection with this operating arm 18 and extends substantially horizontally to a pivotal connection 21 provided in an ear extending outwardly from the spring pad 14. Normally the link 19 is substantially horizontal with the operating arm 18 in its full line position. When the spring 11 receives an upward deflection, however, the pivot 21 carries the link 19 upwardly on an arc towards the upper dotted line position. This draws the operating arm 18 to the left to a greater or less extent, depending upon the degree of deflection of the spring. Upon the restoration of the spring 11 the operating arm 18 is returned to approximately its full line position. This same action occurs on a downward deflection of the spring, the downward movement of the pivot 21 drawing the operating arm 18 to the left and then returning it with the upward movement of the spring. The motion of the operating arm to the left is substantially free from frictional resistance, but motion of the same to the right is retarded by a diminishing frictional resistance obtained by frictional mechanism which I shall now describe.

As shown in Figure 4, the bracket 17 has an opening 23 in its lower end, forming a ring-like mounting in which is supported the shock absorber proper. Extending from one side of the bracket 17 is a drum shaped housing 24 having a peripheral flange 25 which is secured to the side of the bracket 17. From the other side extends the casing 26 which is also flanged at 27 for attachment to the bracket 17. A bolt 28 is passed through the housings 24 and 26 and has nuts 29 on its outer ends for holding the same in the housings.

The operating arm 18 extends up into the housing portion 24 through a slot 31 in the under side thereof, and has rigid connection with a hollow hub 32. This hub is journaled for rotation on collars 33 and 34, mounted on the bolt or shaft 28, this hub being slidable to the right along the collars 33 and 34 but being limited in movement towards the left by a flange 35 on the collar 34.

The plurality of stationary friction disks 36 and the plurality of movable friction disks 37 are supported respectively on the housing 24 and on the rotatable hub 32. The stationary disks 36 have equidistantly spaced lugs 38 which engage in channel-like recesses 39 projecting outwardly in the housing 24, this arrangement of lugs and recesses rigidly holding the several disks 36 against rotation but permitting sliding movement of the several disks towards and away from each other. The rotatable disks 37 have horizontally turned internal flanges 41. The inner periphery of each of these flanges constitutes a race for a plurality of rollers 42 that are disposed between the flange and the rotatable hub 32. These rollers constitute a roller ratchet which is adapted to clutch the disk 37 to the hub 32 when the latter is rotated in one direction, and to release the disk from the hub when the latter is rotated in the other direction. The several sets of rollers corresponding to the different clutch disks 37 are held in spaced relation by spacing washers 43. The outer periphery of the hub 32 is formed with cams 44, in the same number as the ratchet rollers 42, and projecting from the hub intermediate these cams are longitudinal flanges or ribs 45. Coil springs 46 are interposed between these flanges 45 and the rollers 42. It will be observed that the cams 44 and flanges 45 are symmetrically arranged about the hub 32 so that by placing the rollers 42 and springs 46 on the other sides of the cams the hub member is adapted for a reversed direction of clutching, rotation for the other side of the car. Thus the same standard hub unit suffices for both the right and left shock absorbers. The spacing washers 43 are preferably notched out at 47 to engage over each of the flanges 45, permitting sliding movement of these spacing washers for maintaining the proper spaced relation between the ratchet rollers of the several disks. A lock ring 48 threads on the end of the hub 32 and forms a limiting abutment for endwise or lateral motion of the disks.

The spring means for imposing the frictional pressure between the several disks 36 and 37 is preferably in the form of a stiff spring disk 49 which is riveted or otherwise secured around its periphery to the other casing section 26. The pressure of the spring 49 is transmitted to the friction disks in varying degrees—depending upon the angular rotation of the hub member 32—through a series of helical cam faces 51 formed about the periphery of a block or plate 52 which is riveted to the spring disk 49. The hub 32 is formed of an extending flange 53 which is also provided with the laterally extending helical cam faces 54 bearing against the opposing cam faces 51. There are preferably a series of such pairs of opposing cams about the plate 52 and flange 53, the pitch of these cams being proportioned to the strength of the spring disk 49 in such a manner that when the operating arm 18 is moved through its maximum throw to the left (Fig. 1), by maximum deflection of the spring 11, a predetermined maximum pressure will be transmitted through the hub member 32 to the disks 36 and 37. Facility of adjustment of the pressure of the spring disk 49 is desirable because it is desirable to have a low degree of friction or no friction between the disks in the normal position of the axle relative to the chassis frame. Accordingly, I propose mounting the casing section 26 in such manner that it may rotate through a short range in either direction to force the cam faces 54 up or down along the cam faces 51 and thereby place spring 49 under a greater or less initial tension. A pin 55 projecting from the bracket 17 is engageable in any one of the series of holes 56 in the casing flange 27 for holding the casing in such adjusted position, and the bolts or screws for securing the casing section to the bracket 17 may engage in slots or be otherwise arranged for permitting the angular adjustment of the casing. The spring 49 may be a circular disk or may be of star-shaped outline. The pressure transmitted to the multiplicity of frictional disks is equally distributed between the several disks by reason of their slidable mounting on the hub member 32 and casing section 24. An annular depression 58 in the end wall of the casing section 24 forms an abutment against which the disks are compressed. The faces of the disks may be surfaced with any suitable frictional material 59. The slot 31 in the bottom of the casing section 24 may be covered by an arcuate plate 61 which is carried by the operating arm 18 and movable therewith so as to cover the slot 31 in all positions of the arm 18.

When the axle is in the normal steady load position relative to the vehicle the spring disk 49 is under practically no tension, so that there is practically no tension being transmitted to the axle tending to restrain it against movement upward or down. This gives the vehicle spring 11 entire independence in absorbing the initial impact of the bump or hole. Furthermore, the absence of any restraining influence of these shock absorbers gives the car freedom of lateral sway or rocking motion between the tonneau and axle. The action of the shock absorbers in damping only the return motion towards normal permits the axle to rock sharply without augmented shock from the resistance of the shock absorbers. The shock absorbers give freedom of movement to the end of the axle receding from the frame and to the end of the axle approaching the frame, whereas the prior forms of shock absorbers tend either to restrict the end rocking away from the frame or the end rocking up towards the frame, or both. Moreover, the freedom of the front leaf springs to deflect out of normal position without restraint on the part of the shock absorbers minimizes the angle of tilt back of the chassis frame when the front wheels strike a bump.

When the leaf spring 11 is deflected upwardly relative to the chassis frame 9 the movement of the operating arm 18 to the left produces no relative rotation between the friction disks, because in this direction of rotation of the hub 32 the ratchet rollers are forced away from the cams 44, and the hub slips inside of the rotatable disks 37. During this angular motion of the operating arm 18, however, the shock absorbing tension is being built up in the spring disk 49 and is being impressed upon the friction disks 36 and 37. The degree of tension built up in the spring disk 49 is dependent upon the extent of angular movement of the operating arm acting through the opposing cam faces 51 and 54, which movement is controlled by the degree of deflection of the leaf spring 11. Instantaneously with the motion of the operating arm 18 in the other direction under the return flexure of the leaf spring 11, the ratchet rollers 42 grip the rotatable disks 37 to the hub 32, and thereafter the return motion of the operating arm 18 is subject to the retarding action of the multiplicity of friction disks. During the initial part of this return motion the friction disks are subjected to all the pressure which has been accumulated in the spring disk 49, to check the high restoring force which has been built up in the leaf spring 11. As this restoring force diminishes, the pressure imposed by the leaf spring 49 also diminishes under the action of the cam faces 51 and 54 sliding down each other. Consequently, the diminishing restoring force of the leaf spring is opposed by a diminishing frictional restrain, so that when the axle is in its normal position and the restoring force is nil, the frictional restraint will also be practically nil.

Downward deflection of the leaf spring 11 relative to the chassis frame, as when the wheel drops into a hole, produces the same action in the shock absorber, the downward deflection being substantially unopposed, and the return deflection being opposed by a diminishing frictional restraint.

It will be noted that the rotatable disks 37 are only rotated in one direction, that is to say they are given a one step advancement each time the operating arm 18 is oscillated to and fro. Consequently, the friction disks are always presenting new surfaces to each other so that the wear is distributed and thereby reduced. Owing to the large number of these friction disks 36 and 37 and the extensive area of frictional surface only a comparatively light spring pressure is required. This light spring pressure reduces any tendency of the friction disks to squeak. It will furthermore be noted that, owing to the sharp pitch of the cam faces 51 and 54 these cam faces are relatively ineffective for transmitting any pressure existing in the spring disk 49 back to the operating arm 18, so that in the event that an initial tension has been given the spring 49 this tension will not be transmitted back through the operating arm 18, tending to force the axle out of its normal position. The substantially horizontal alignment of the link 19 also prevents any initial tension given the shock absorber from forcing the axle out of its normal position. The pivot 21 swings more or less in an arc circumscribed from the spring pivot 12', and it will be observed that pivot 21 may be considered as the knuckle of a toggle the two arms of which consist of the link 19 and the arm extending from the pivot 21 to the pivot 12'.

In the form shown in Figure 1, the position of the operating arm 18 is made, of course, somewhat dependent upon the means employed to regulate the fore and aft position of the axle. In this instance this is of course provided for by the direct pivotal connection of the leaf spring 11 to the fixed bracket 12. If for any reason this is not desirable, as for example, if it is desired to mount each end of the spring 11 in a shackle link 13 as shown in Figure 2, a link motion may be employed whereby the vertical motion of the axle generates the required angular movement of the operating arm 18 irrespective of any fore and aft motion of the axle. This system of linkage is illustrated in Figure 2, wherein the drum unit 16 of the shock absorber is mounted on a depending bracket 17, with the operating arm 18 extending upwardly therefrom. A lever 62 is pivoted approximately centrally at 63 of the channel 9, or on a bracket secured thereto. One end of this lever 62 is connected through a link 64 with the operating arm 18, and the other end of the lever is connected through a rod or link 65 with the spring or spring pad 14. It will be apparent that with this system of linkage only the vertical component of motion of the axle 8 will be transmitted to the operating arm 18 regardless of any fore and aft component. By increasing the length of the right hand arm of the lever 62 the action may be multiplied so that the operating arm 18 will be given a considerably wider range of movement. The clutching rollers 42 are placed on the reverse sides of the cams 44, in this form, to take care of the reversed direction of clutching rotation.

In Figure 3, I have illustrated a modified arrangement. Here the drum unit 16 is also mounted on a bracket 17 depending from the channel member 9, but in this instance the operating arm 18 has direct connection with the axle or springs through a link or strap 67. A strap is preferable because in the installation of the shock absorber it merely requires buckling to the axle 8. The slot 31 in the casing, through which extends the operating arm 18, is continued around to accommodate the extension of a spring arm 68 which is either formed integral with the arm 18 or is otherwise rigidly secured to the rotatable hub 32. A tension spring 69 is extended between the end of the arm 68 and a fixed point 70 on the chassis frame. The above arrangement of spring is merely exemplary, as a helical or spiral spring may be embodied in the drum unit 16 for revolving the operating arm 18 upwardly when the axle deflection is upward. The tension of the spring 69 must be somewhat in excess of the maximum tension to be built up in the spring disk 49, because in the present instance it is the spring 69 which rotates the operating arm 18 upwardly and imparts tension to the spring disk 49. In this embodiment the cam faces 51 and 54 are either given a greater angular length or are otherwise proportioned to the whole range of movement of the operating arm 18 so that these cam faces will not ride off each other when the operating arm 18 drops down to its lowest position by the downward deflection of the leaf spring 11.

Upward deflection of the axle is unopposed by any frictional restraint in the shock absorber, but the return movement of the axle to normal position is opposed by a diminishing frictional restraint, as in the previous embodiment. Upon a downward depression of the axle it will be apparent that the movable friction disks will be rotated, but the retarding effect of such rotation will depend to a large extent upon the initial tension given the spring disk 49. If a considerable initial tension is given the spring disk 49 this rotation of the clutch disks may exert a retarding force against the downward displacement of the axle from normal.

It will be apparent that the principles of my invention can be embodied in widely different constructions from that herein shown, and I do not intend, therefore, to be limited to the particular details hereinbefore shown and described.

I claim:

1. In a shock absorber of the class described, the combination of a pair of frictional surfaces normally separated, means for placing said frictional surfaces under pressure during the displacing motion of the axle relative to the frame above or below normal, and means for causing relative motion between said frictional surfaces during the return motion of said axle back towards normal.

2. In combination with a shock absorber adapted for retarding relative movement between a vehicle axle and a frame, of a pair of frictional surfaces, means for placing said frictional surfaces under pressure during the deflecting motion of said axle relative to said frame above or below normal, and means for causing relative motion between said frictional surfaces only during the return motion of said axle towards normal.

3. In a shock absorber adapted for absorbing shocks between a vehicle axle and frame, the combination of a pair of friction surfaces, means for imposing an increasing spring pressure on said frictional surfaces during deflecting motion of said axle away from normal in either direction, and means for causing relative movement between said friction surfaces only during the return motion of said axle towards normal.

4. In a shock absorber for retarding motion between a vehicle axle and frame, the combination of a pair of friction surfaces, ratchet means for causing relative motion between said friction surfaces upon movement in either direction of said axle from said frame, and cam means for imposing pressure between said surfaces proportional to the distance of movement of said axle.

5. In a device for absorbing shocks between a vehicle frame and axle, the combination of a pair of frictional surfaces, ratchet means for causing relative motion between said frictional surfaces during one direction of relative motion between said axle and frame and means actuated thereby to impose pressure on said surface proportional to the degree of relative movement between the axle and frame.

6. In a device for absorbing shocks between a vehicle axle and frame, the combination of a motion retarding member, and ratchet means for causing said motion retarding means to be effective only during the return motion of the axle towards normal position from either side thereof.

7. In a shock absorber, the combination of a supporting member that has stationary mounting on a vehicle frame, a plurality of stationary frictional surfaces carried by said stationary member, a movable member adapted to move with motion of the axle relative to said frame, a plurality of movable frictional surfaces moved by said movable member, and a comparatively light tension spring member for exerting a spring pressure between said plurality of stationary and movable frictional surfaces in proportion to the relative movements between the axle and frame.

8. In a shock absorber, the combination of a plurality of relatively stationary frictional surfaces, a plurality of relatively movable frictional surfaces, an operating member for actuating said movable surfaces, ratchet means between said operating member and said movable surfaces, and a comparatively light spring plate exerting pressure between said plurality of stationary and movable surfaces in proportion to the degree of deflection from normal position of two movable parts to which the shock absorber is connected and adapted to exert friction only on return movement toward normal position from either side thereof.

9. In a shock absorber, the combination of a casing adapted to be fixedly attached to the vehicle frame, a friction disk carried by said casing, a hub member rotatably journaled in said casing, a rotatable friction disk carried by said hub member and cooperating with said stationary friction disk, an operating arm having connection with said hub member, said operating arm adapted to be operatively connected with the axle of the vehicle, and ratchet mechanism interposed between said hub member and said rotatable friction disk whereby to cause said friction disks to offer a retarding action to the return movement of the frame or axle toward normal position from either side thereof.

10. In a shock absorber, the combination of a casing, a plurality of relatively stationary friction disks carried by said casing, a rotatable hub member journaled in said casing, an operating arm for actuating said hub member, a plurality of rotatable friction disks interposed between said stationary disks and rotatable by said hub member, an operating arm for actuating said hub member, a spring for imposing pressure upon said stationary and rotatable friction disks, means for placing said spring under pressure during one direction of motion of said operating arm at either side of normal, and ratchet means for operatively connecting said rotatable friction disk to said hub member during the other direction of motion of operating arm whereby to cause a retarding force to be exerted on return movement of the axle toward normal position from either side thereof.

11. In a shock absorber, the combination of the casing, a plurality of non-rotatable friction disks slidably mounted in said casing, a hub member journaled in said casing, an operating arm extending from said hub member, a plurality of rotatable friction disks interposed between said non-rotatable disks, a spring for exerting inward pressure upon the rotatable and non-rotatable disks, cam means cooperating with said hub member for stressing said spring during one direction of motion of said operating arm, and ratchet means interposed between said hub member and said rotatable disks whereby said rotatable disks remain substantially stationary during the latter direction of said operating arm, but are rotated during the reverse direction of rotation of said operating arm whereby the device is effective only on return movement toward normal position from either side thereof.

12. In a shock absorber, the combination of a casing adapted to be fixedly mounted on the vehicle frame, a plurality of non-rotatable friction disks slidably mounted in said casing, a hub member journaled for rotation in said casing, a plurality of rotatable disks interposed between said non-rotatable disks, said rotatable disks having central flanged portions, ratchet rollers interposed between said flanged portions and said hub member, an operating arm for oscillating said hub member, a spring disk carried by said casing, and cooperating cam members carried by said spring disk and by said hub member whereby motion of said operating arm is effective to transmit pressure from said spring disk to said plurality of friction disks.

13. In a device for absorbing shocks between a vehicle axle and frame, the combination of a motion retarding member, ratchet means for causing said motion retarding member to be effective during the return motion of the axle toward normal, and means cooperative with the ratchet means to vary the retarding action.

14. In a device for absorbing shocks between a vehicle axle and frame, the combination of a motion retarding means and ratchet means for causing said motion retarding means to be effective only during the return motion of the axle toward normal and means operated by the ratchet means to vary the retarding action proportionately with the variation in the relative movement between the axle and frame.

15. In a shock absorber, the combination of a casing adapted to be fixedly attached to a vehicle frame, a friction disk carried by said casing, a hub member rotatably journaled in said casing, a rotatable friction disk carried by said hub member and cooperating with said stationary friction disk, an operating arm having connection with said hub member and adapted to be operatively connected with the axle of the vehicle, and ratchet mechanism interposed between said hub member and said rotatable friction disk to permit independent movement thereof in one direction and to cause simultaneous movement thereof in another direction, said device being effective only on return movement toward normal position from either side thereof.

16. In a shock absorber, the combination with a casing adapted to be fixed to a movable part, a friction disk carried by the casing, a hub member journaled in said casing, a movable friction disk carried by the hub member and cooperating with the stationary friction disk, an operating arm adapted to be connected operatively with another movable part, and ratchet mechanism interposed between the hub and movable friction disk whereby to permit relative movement therebetween in one direction and cause joint movement thereof in another direction, said friction disks moving free in one direction when the parts move relatively away from normal and gripping each other on return movement toward normal from either side thereof.

17. In a shock absorber, the combination of a casing, a plurality of non-rotatable friction disks slidably mounted in said casing, a hub member journaled in said casing, an operating arm extending from said hub member, a plurality of movable friction disks interposed between said non-rotatable disks, means for exerting inward pressure upon the disks to cause them to frictionally engage, cam means cooperating with said hub member for stressing said last mentioned means during one direction of motion of said operating arm, and ratchet means interposed between the hub member and movable disks whereby the latter remain stationary in one direction of motion of the operating arm and are moved during another direction of motion thereof, whereby the device is effective only on return movement toward normal position from either side thereof.

In witness whereof, I hereunto subscribe my name this 25th day of September, 1922.

FRANK C. MOCK.